United States Patent
Han et al.

(10) Patent No.: US 11,379,381 B2
(45) Date of Patent: Jul. 5, 2022

(54) MAIN MEMORY DEVICE HAVING HETEROGENEOUS MEMORIES, COMPUTER SYSTEM INCLUDING THE SAME, AND DATA MANAGEMENT METHOD THEREOF

(71) Applicant: SK hynix Inc., Gyeonggi-do (KR)

(72) Inventors: Mi Seon Han, Seoul (KR); Yun Jeong Mun, Gyeonggi-do (KR); Young Pyo Joo, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 52 days.

(21) Appl. No.: 16/593,756

(22) Filed: Oct. 4, 2019

(65) Prior Publication Data

US 2020/0218668 A1  Jul. 9, 2020

(30) Foreign Application Priority Data

Jan. 7, 2019  (KR) .................. 10-2019-0001723

(51) Int. Cl.
| | |
|---|---|
| *G06F 12/122* | (2016.01) |
| *G06F 12/123* | (2016.01) |
| *G06F 12/14* | (2006.01) |
| *G06F 13/16* | (2006.01) |
| *G06F 1/3234* | (2019.01) |
| *G06F 12/0882* | (2016.01) |

(52) U.S. Cl.
CPC .......... *G06F 12/122* (2013.01); *G06F 1/3275* (2013.01); *G06F 12/0882* (2013.01); *G06F 12/123* (2013.01); *G06F 12/1458* (2013.01); *G06F 13/1668* (2013.01); *G06F 2212/1024* (2013.01)

(58) Field of Classification Search
CPC .. G06F 12/122; G06F 12/0882; G06F 12/123; G06F 12/1458; G06F 1/3275; G06F 13/1668; G06F 2212/1024
See application file for complete search history.

(56) References Cited

U.S. PATENT DOCUMENTS

| | | | |
|---|---|---|---|
| 10,127,156 B1 * | 11/2018 | Yan ...................... | G06F 12/0873 |
| 10,599,585 B2 * | 3/2020 | Wysoczanski ........ | G06F 12/123 |
| 10,691,613 B1 * | 6/2020 | Tong .................... | G06F 12/0811 |
| 10,877,879 B1 * | 12/2020 | Li ........................ | G06F 12/0246 |
| 11,042,307 B1 * | 6/2021 | Li .......................... | G06F 3/0616 |

(Continued)

FOREIGN PATENT DOCUMENTS

| | | |
|---|---|---|
| KR | 10-2013-0022604 A | 3/2013 |
| KR | 101403922 | 6/2014 |

(Continued)

OTHER PUBLICATIONS

Office Action issued by the USPTO for U.S. Appl. No. 16/839,708 dated Sep. 17, 2021.

(Continued)

*Primary Examiner* — Prasith Thammavong
(74) *Attorney, Agent, or Firm* — IP & T Group LLP

(57) ABSTRACT

A main memory device includes a first memory device; and a second memory device having an access latency different from that of the first memory device. The first memory device determines, based on an access count for at least one region of the first memory device, a hot page included in the at least one region.

34 Claims, 12 Drawing Sheets

224

| | Access count | Hot page address |
|---|---|---|
| REGION1 | m | ADDR_H |
| REGION2 | | |
| ⋮ | ⋮ | ⋮ |
| REGIONn | | |

(56) References Cited

U.S. PATENT DOCUMENTS

| | | | |
|---|---|---|---|
| 2008/0052466 A1* | 2/2008 | Zulauf | G06F 12/1458 711/125 |
| 2009/0144501 A2* | 6/2009 | Yim | G06F 12/0246 711/120 |
| 2010/0095049 A1* | 4/2010 | Manning | G06F 12/123 711/158 |
| 2010/0235569 A1 | 9/2010 | Nishimoto et al. | |
| 2012/0017042 A1 | 1/2012 | Matsui et al. | |
| 2014/0258642 A1* | 9/2014 | Bell, Jr. | G06F 12/0815 711/141 |
| 2014/0297977 A1* | 10/2014 | Sueda | G06F 3/067 711/160 |
| 2015/0058522 A1 | 2/2015 | Armstrong et al. | |
| 2015/0279436 A1* | 10/2015 | Ryoo | G11C 8/06 711/105 |
| 2016/0034195 A1* | 2/2016 | Li | G06F 3/0659 711/117 |
| 2016/0357480 A1 | 12/2016 | Choi | |
| 2016/0371019 A1 | 12/2016 | Kang | |
| 2017/0024326 A1* | 1/2017 | Luo | G06F 12/1009 |
| 2017/0052822 A1* | 2/2017 | Ash | G06F 9/5083 |
| 2017/0271581 A1* | 9/2017 | Seong | H01L 27/2427 |
| 2018/0046411 A1* | 2/2018 | Coburn | G06F 12/0835 |
| 2018/0067856 A1* | 3/2018 | Walker | G06F 12/0868 |
| 2018/0260323 A1 | 9/2018 | John et al. | |
| 2019/0179698 A1* | 6/2019 | Liu | G06F 3/0614 |
| 2020/0218668 A1* | 7/2020 | Han | G06F 1/3275 |
| 2021/0049101 A1* | 2/2021 | Ray | G06F 3/0659 |

FOREIGN PATENT DOCUMENTS

| | | |
|---|---|---|
| KR | 1020150082461 | 7/2015 |
| KR | 1020190038964 | 4/2019 |
| WO | 2011163407 | 12/2011 |
| WO | 2014074717 | 5/2014 |

OTHER PUBLICATIONS

Office Action issued by the USPTO for U.S. Appl. No. 16/839,708 dated Feb. 23, 2022.

* cited by examiner

224

| | Access count | Hot page address |
|---|---|---|
| REGION1 | | |
| REGION2 | | |
| ⋮ | ⋮ | ⋮ |
| REGIONn | | |

REGION1

| | Access count | Hot page address |
|---|---|---|
| REGION1 | m | ADDR_H |
| REGION2 | | |
| ⋮ | ⋮ | ⋮ |
| REGIONn | | |

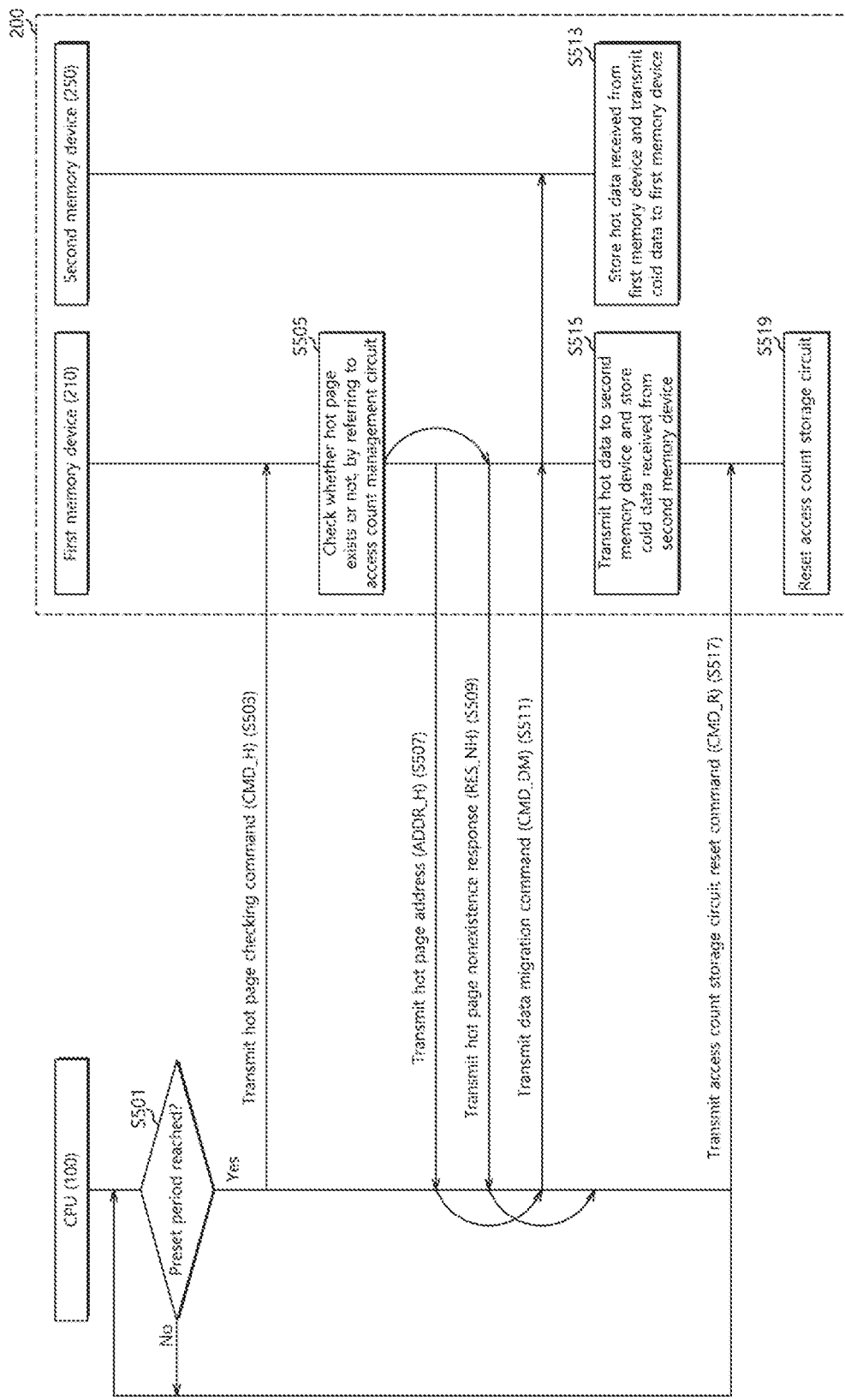

FIG.6
LRUQ1
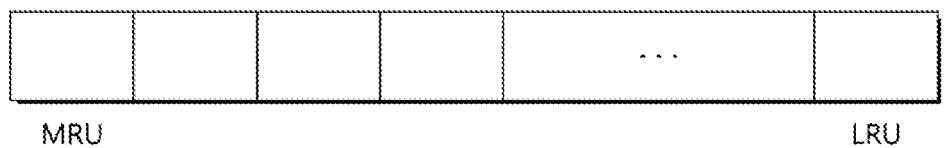
LRUQ2
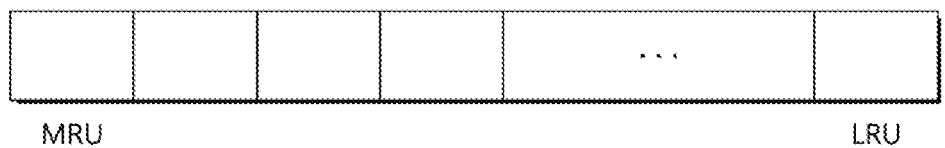

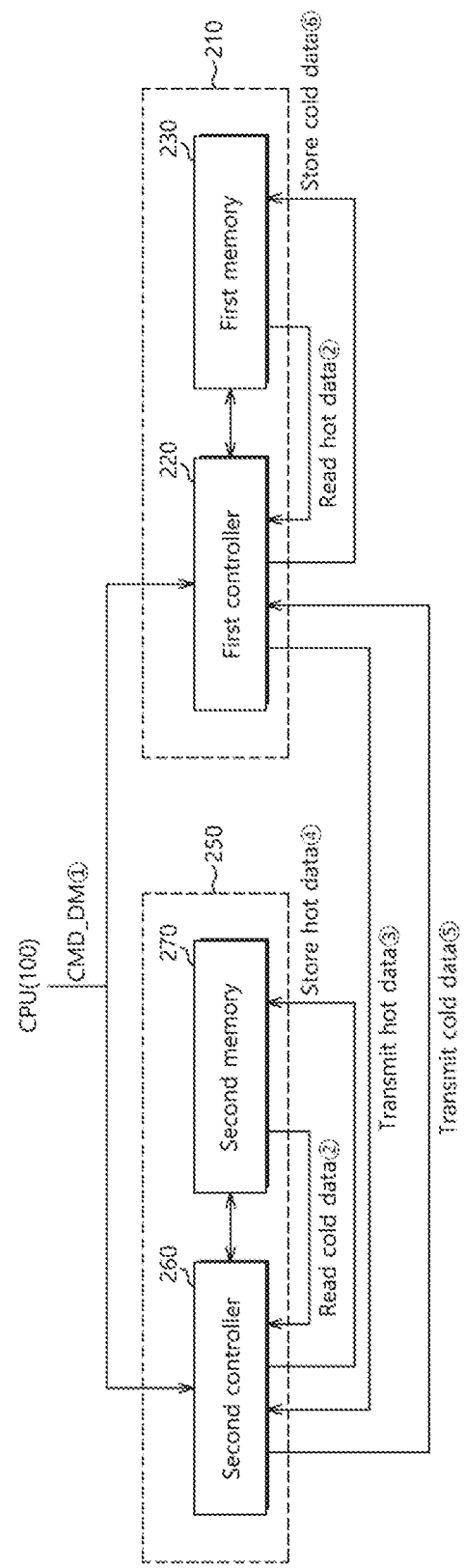

FIG.7B
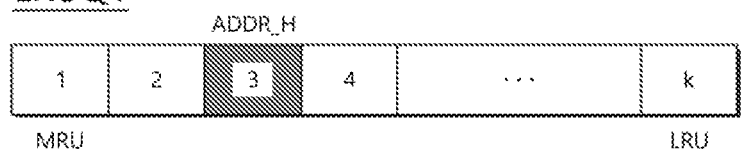
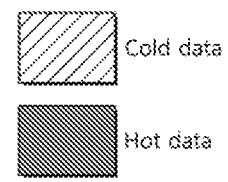
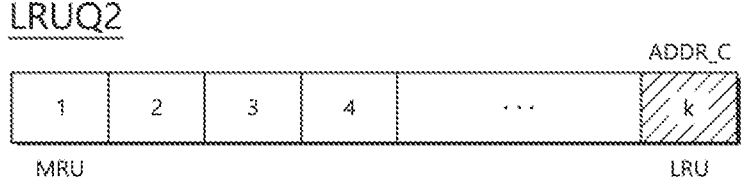
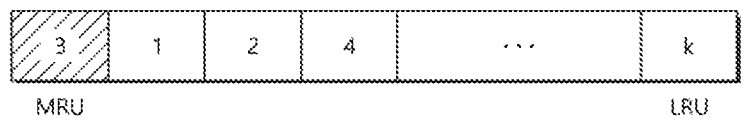
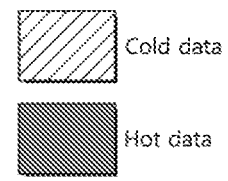
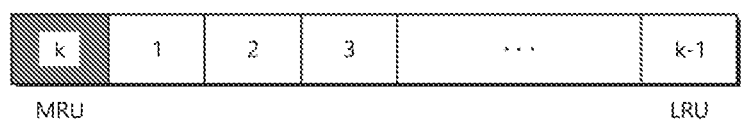

MAIN MEMORY DEVICE HAVING HETEROGENEOUS MEMORIES, COMPUTER SYSTEM INCLUDING THE SAME, AND DATA MANAGEMENT METHOD THEREOF

CROSS-REFERENCE TO RELATED APPLICATION

The present application claims priority under 35 U.S.C. § 119(a) to Korean application number 10-2019-0001723, filed on Jan. 7, 2019, in the Korean Intellectual Property Office, which is incorporated herein by reference in its entirety.

BACKGROUND

1. Technical Field

Various embodiments generally relate to a computer system, and more particularly, to a computer system including a main memory device having heterogeneous memories and a data management method thereof.

2. Related Art

A computer system may include various types of memory devices. A memory device includes a memory for storing data and a memory controller which controls the operation of the memory. A memory may be a volatile memory such as a DRAM (dynamic random access memory) or an SRAM (static random access memory), or a nonvolatile memory such as an EEPROM (electrically erasable programmable ROM), an FRAM (ferroelectric RAM), a PCRAM (phase change RAM), an MRAM (magnetic RAM) or a flash memory. Data stored in a volatile memory is lost when power supply is interrupted, whereas data stored in a nonvolatile memory is not lost even when power supply is interrupted. Recently, a main memory device in which heterogeneous memories, i.e., both volatile and nonvolatile memories, are mounted is being developed.

A volatile memory has a high operating (for example, write and read) speed, whereas a nonvolatile memory has a relatively low operating speed. Due to this fact, in order to improve the performance of a memory system, data (for example, hot data) which is frequently accessed needs to be stored in a volatile memory, and data (for example, cold data) which is not frequently accessed needs to be stored in a nonvolatile memory.

SUMMARY

Various embodiments are directed to a main memory device having heterogeneous memories, a computer system including the same and a data management method thereof, capable of improving an operation performance through a data migration depending on an access count.

In an embodiment, a main memory device may include: a first memory device; and a second memory device having an access latency different from that of the first memory device. The first memory device may determine, based on an access count for at least one region of the first memory device, a hot page included in the at least one region.

In an embodiment, a main memory device may include: a first memory device; and a second memory device having a power consumption per unit time different from that of the first memory device. The first memory device may determine, based on an access count for at least one region of the first memory device, a hot page included in the at least one region.

In an embodiment, a computer system may include: a central processing unit (CPU); and a main memory device coupled with the CPU through a system bus. The main memory device may comprise a first memory device; and a second memory device having an access latency shorter than that of the first memory device. The first memory device may determine, based on an access count for each of one or more regions of the first memory device, a hot page included in at least one of the one or more regions.

In an embodiment, a data management method of a computer system including a central processing unit (CPU) and a main memory device which is coupled with the CPU through a system bus and is configured with a first memory device and a second memory device having different access latencies may include: transmitting, by the CPU to the first memory device, a hot page checking command for checking whether a hot page exists in a first memory of the first memory device; transmitting, by the first memory device to the CPU, one of a first response including an address corresponding to the hot page in the first memory and a second response indicating that the hot page does not exist in the first memory depending on whether the hot page exists or not; and transmitting, by the CPU to the main memory device, when the first response is received from the first memory device, a data migration command for exchanging hot data stored in the hot page of the first memory and cold data in a second memory of the second memory device.

In an embodiment, a memory system may include: a first memory device including plural groups each having one or more first memory regions; a second memory device including plural second memory regions; a first controller configured to identify a hot memory region, which is most recently accessed among the first memory regions within a group that has been accessed more than any of the other groups or a greater number of times than a threshold; and a second controller configured to identify a cold memory region, which is least recently accessed among the second memory regions. The first and second controllers respectively control the first and second memory devices to swap data between the hot memory region and the cold memory region.

In an embodiment, a memory system may include: a first memory device including plural groups each having one or more first memory regions; a second memory device; a first controller configured to identify a hot memory region, which is most recently accessed among the first memory regions within a group that has been accessed more than any of the other groups or a greater number of times than a threshold; and a second controller configured to control an operation of the second memory device. The first and second controllers respectively control the first and second memory devices to migrate data of the hot memory region to the second memory device.

According to the embodiments, since hot data of a high access frequency and cold data of a low access frequency may be precisely tracked in a main memory device and thereby valid (or meaningful) hot data may be migrated to a memory of which the operation speed is high, the operation performance of an entire system may be improved.

Also, according to the embodiments, by determining hot data based on a probability, it is possible to track a hot page in which hot data is stored, even though an access count is managed by a unit larger than a page, and as a result, a data migration may be performed by the unit of page.

Further, according to the embodiments, by managing an access count by the unit of a page group including a plurality of pages, it is possible to prevent a storage overhead for storage of access counts from increasing.

BRIEF DESCRIPTION OF THE DRAWINGS

FIG. 4C is a diagram illustrating an example of a state in which a hot page address is stored in the access count storage circuit.

FIG. 5 is a flow chart to assist in the explanation of a data management method in accordance with an embodiment of the present invention.

FIG. 6 is a diagram illustrating an example of LRU (least recently used) queues for a first memory and a second memory, respectively.

FIG. 7A is a diagram illustrating an example of data migration between a first memory device and a second memory device.

FIG. 7B is a diagram to assist in the explanation of a state in which a first LRU queue and a second LRU queue are updated after data migration.

DETAILED DESCRIPTION

A main memory device having heterogeneous memories, a computer system including the same, and a data management method thereof are described below with reference to the accompanying drawings through various embodiments. Throughout the specification, reference to "an embodiment," "another embodiment" or the like is not necessarily to only one embodiment, and different references to any such phrase is not necessarily to the same embodiment(s).

Figure 1:
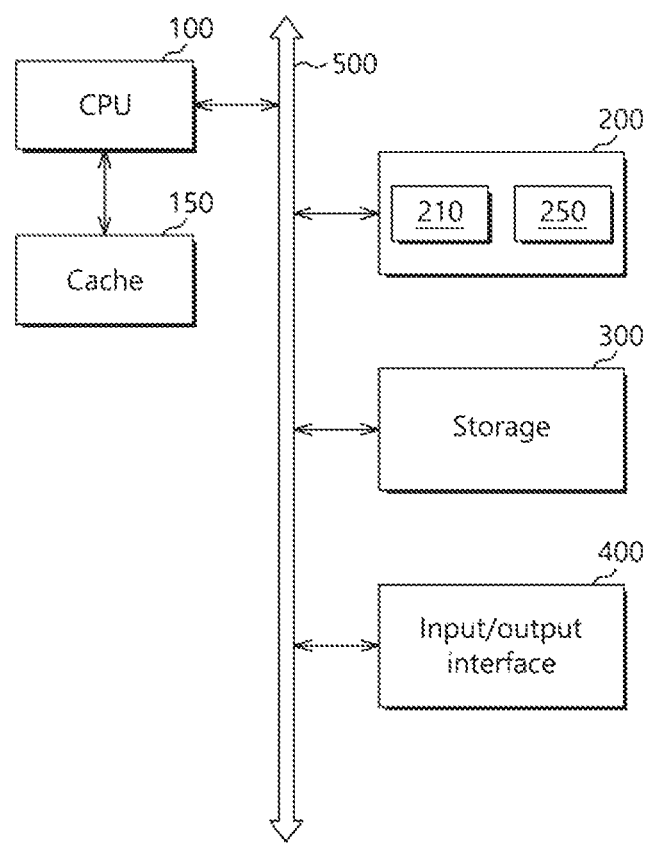
FIG. 1 is a diagram illustrating a computer system in accordance with an embodiment of the present invention.

FIG. 1 is a diagram illustrating an example of a computer system 10 in accordance with an embodiment.

The computer system 10 may be, for example, a general-purpose or special-purpose computer system such as a mainframe computer, a server computer, a personal computer, a mobile appliance and/or a programmable home electronics product.

Referring to FIG. 1, the computer system 10 includes a central processing unit (CPU) 100, a main memory device 200, a storage 300 and an input/output interface 400 which are electrically coupled to a system bus 500. According to an embodiment, the computer system 10 may further include a separate cache memory 150 which is coupled to the CPU 100.

The CPU 100 may be implemented with any of various commercially available processors. For example, the CPU 100 may include, without a limitation, any of AMD® Athlon®, Duron® and Opteron® processors; ARM® application, embedded and secure processors; an IBM®, Motorola®, Dragonball® and PowerPC® processors; IBM and Sony® cell processors; Intel® Celeron®, Core(2) Duo®, Core i3, Core i5, Core i7, Itanium®, Pentium®, Xeon®, and XScale® processors; and similar processors. Dual microprocessors, multi-core processors and other multi-processor architectures may be adopted as the CPU 100.

The CPU 100 may execute or process programs and/or data stored in the main memory device 200. For example, the CPU 100 may execute or process the programs and/or the data in response to a clock signal outputted from a clock signal generator (not illustrated).

The CPU 100 may be configured to access the cache memory 150 and the main memory device 200. For example, the CPU 100 may store data in the main memory device 200. Further, the CPU 100 may read data stored in the cache memory 150 and the main memory device 200.

The CPU 100 may perform various operations based on data stored in the main memory device 200. For example, the CPU 100 may instruct the main memory device 200 to perform a data migration between a first memory device 210 and a second memory device 250.

The cache memory 150 refers to a general-purpose memory for reducing a bottleneck phenomenon due to a speed difference between a device having a high speed and a device having a low speed. That is to say, the cache memory 150 serves to alleviate a data bottleneck phenomenon between the CPU 100 which operates at a high speed and the main memory device 200 which operates at a relatively low speed. The cache memory 150 may cache data frequently accessed by the CPU 100 among data stored in the main memory device 200.

While not illustrated in FIG. 1, the cache memory 150 may include a plurality of caches. For example, the cache memory 150 may include an L1 cache and an L2 cache. Here, 'L' denotes level with the associated number indicating a specific level on a relative scale. In general, the L1 cache may be built in the CPU 100 and may be used first for the reference and use of data. The L1 cache may be fastest in speed among caches, but a storage capacity thereof may be small. If data does not exist in the L1 cache (for example, in the case of a cache miss), the CPU 100 may access the L2 cache. The L2 cache may be relatively slower in speed than the L1 cache, but a storage capacity thereof may be larger. If data does not exist even in the L2 cache, the CPU 100 accesses the main memory device 200.

The main memory device 200 may include the first memory device 210 and the second memory device 250. The first memory device 210 and the second memory device 250 may have different structures. For instance, the first memory device 210 may include a nonvolatile memory (NVM) and a controller which controls the nonvolatile memory, and the second memory device 250 may include a volatile memory (VM) and a controller which controls the volatile memory. For example, the volatile memory may be a DRAM (dynamic random access memory) and the nonvolatile memory may be a PCRAM (phase change RAM), but the present invention is not specifically limited to that configuration.

The computer system 10 may store data in the main memory device 200 for a short time and temporarily. The main memory device 200 may store data of a file system format, or may store an operation system program by separately setting a read-only space. When the CPU 100 executes an application program, at least a part of the application program may be read from the storage 300 and be loaded to the main memory device 200. The main memory device 200 is described below in detail with reference to drawings.

The storage 300 may include at least one of a hard disk drive (HDD) and a solid state drive (SSD). A storage refers to a storage medium in which the computer system 10 stores user data for a long time. An operation system (OS), an application program, program data and so forth may be stored in the storage 300.

The input/output interface 400 may be configured by an input interface and an output interface. The input interface may be coupled with an external input device. According to an embodiment, the external input device may be a keyboard, a mouse, a mike, a scanner or the like. A user may input a command, data and information to the computer system 10 through the external input device.

The output interface may be coupled with an external output device. According to an embodiment, the external output device may be a monitor, a printer, a speaker or the like. An execution and processing result of the computer system 10 for a user command is expressed through the external output device.

Figure 2:
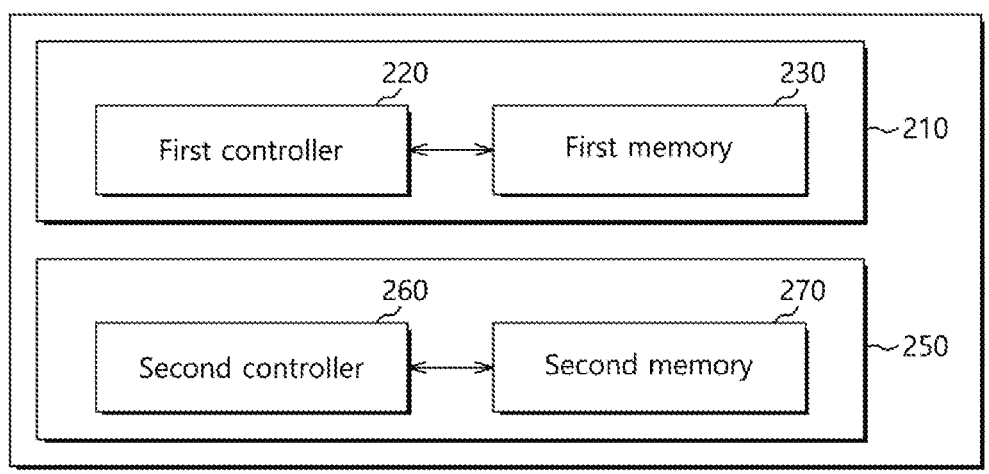
FIG. 2 is a diagram illustrating a configuration of a main memory device, such as that illustrated in FIG. 1.

FIG. 2 is a diagram illustrating an example of the configuration of the main memory device 200 illustrated in FIG. 1.

Referring to FIG. 2, the main memory device 200 may include the first memory device 210 including a first memory 230 as a nonvolatile memory and the second memory device 250 including a second memory 270 as a volatile memory. An operating speed, that is, a write and read speed, of the first memory device 210 may be slower than an operating speed of the second memory device 250, but a storage capacity of the first memory device 210 may be larger than a storage capacity of the second memory device 250.

As described above, in the case where a cache miss occurs in the cache memory 150, the CPU 100 accesses the main memory device 200 and searches for data. Since an operating speed of the second memory device 250 is faster than an operating speed of the first memory device 210, data which the CPU 100 searches for may be more quickly accessed in the case where it is stored in the second memory device 250 than in the case where it is stored in the first memory device 210.

To this end, the CPU 100 may control the main memory device 200 to migrate data that has been accessed many times and thus has a relatively high access count (hot data), among data stored in the first memory device 210, to the second memory device 250, and to migrate data that has been accessed only a few times and thus has a relatively low access count (cold data) among data stored in the second memory device 250, to the first memory device 210.

In this regard, in the case where the CPU 100 manages access counts by the unit of page for the first memory device 210, hot data and cold data of the first memory device 210 determined by the CPU 100 may be different from actual hot data and cold data in the first memory device 210. This is because most of access requests received in the CPU 100 from an external source are hit in the cache memory 150, accesses to the main memory device 200 is only a small fraction and the CPU 100 cannot accurately determine whether accessed data is stored in the cache memory 150 or is stored in the main memory device 200.

Due to this fact, in the present embodiment, the first memory device 210 of the main memory device 200 directly tracks a page of which an access count is relatively high (e.g., a hot page storing hot data) in the first memory 230, and transmits a tracking result to the CPU 100 according to a request of the CPU 100. The CPU 100 controls the main memory device 200 to perform a data migration between the first memory device 210 and the second memory device 250, based on the tracking result received from the first memory device 210. The data migration between the first memory device 210 and the second memory device 250 may be an operation of exchanging hot data in the first memory 230 and cold data in the second memory 270. A detailed configuration and method therefor are described below in detail with reference to drawings.

Continuing to refer to FIG. 2, the first memory device 210 may include a first controller 220 and the first memory 230. The second memory device 250 may include a second controller 260 and the second memory 270. While each of the first memory 230 and the second memory 270 is illustrated simply as block in FIG. 2, this is merely for clarity. As those skilled in the art understand, each of the first memory 230 and the second memory 270 may include a plurality of memory chips.

The first controller 220 of the first memory device 210 may control the operation of the first memory 230. The first controller 220 may control the first memory 230 to perform an operation corresponding to a command received from the CPU 100.

The first controller 220 may group the data storage region of the first memory 230 into a plurality of regions. Each of the plurality of grouped regions may include a plurality of pages. Each such region is considered an 'access management region.' The first controller 220 may manage an access count for each of the access management regions, and may determine a hot page in which hot data is stored in the first memory 230, based on the access counts of the access management regions respectively.

The first controller 220 manages and tracks accesses to the first memory 230 not by the unit of page but by the unit of access management region, which is larger than page, because the storage capacity of the first memory 230 is remarkably large, and to manage such capacity by the unit of page would undesirably increase storage overhead for storing access counts for respective pages increases.

Therefore, in accordance with embodiments of the present invention, in order to prevent storage overhead from increasing, each access count is with respect to an access management region, which unit is larger than that of a page. Determination of a hot page in the first memory 230 by the first controller 220 based on access count for the access management regions, respectively, is described below in detail with reference to drawings.

The first memory 230 may include a memory cell array (not illustrated) which is constituted by a plurality of memory cells, a peripheral circuit (not illustrated) for writing data to the memory cell array or reading data from the memory cell array, and control logic (not illustrated) for controlling the operation of the peripheral circuit. The first memory 230 may be a nonvolatile memory. For example, the first memory 230 may be configured by a PCRAM. However, that is merely an example; the first memory 230 may be configured by any of various nonvolatile memories.

The second controller 260 of the second memory device 250 may control the operation of the second memory 270. The second controller 260 may control the second memory 270 to perform an operation corresponding to a command received from the CPU 100. The second memory 270 may perform an operation of writing data to a memory cell array (not illustrated) or reading data from the memory cell array, depending on a command provided from the second controller 260.

The second memory 270 may include the memory cell array which is constituted by a plurality of memory cells, a peripheral circuit (not illustrated) for writing data to the memory cell array or reading data from the memory cell array, and control logic (not illustrated) for controlling the operation of the peripheral circuit.

The second memory 270 may be a volatile memory. For example, the second memory 270 may be configured by a DRAM. However, that is merely an example; the second memory 270 may be configured by any of various volatile memories.

The first memory device 210 may have a relatively longer access latency than the second memory device 250. An access latency may mean a period of time from a time at which a command is transmitted from the CPU 100 to a time at which an operation corresponding to the transmitted command is completed and a response is transmitted to the CPU 100. The first memory device 210 may have a relatively larger power consumption amount per unit time than the second memory device 250.

Figure 3A:
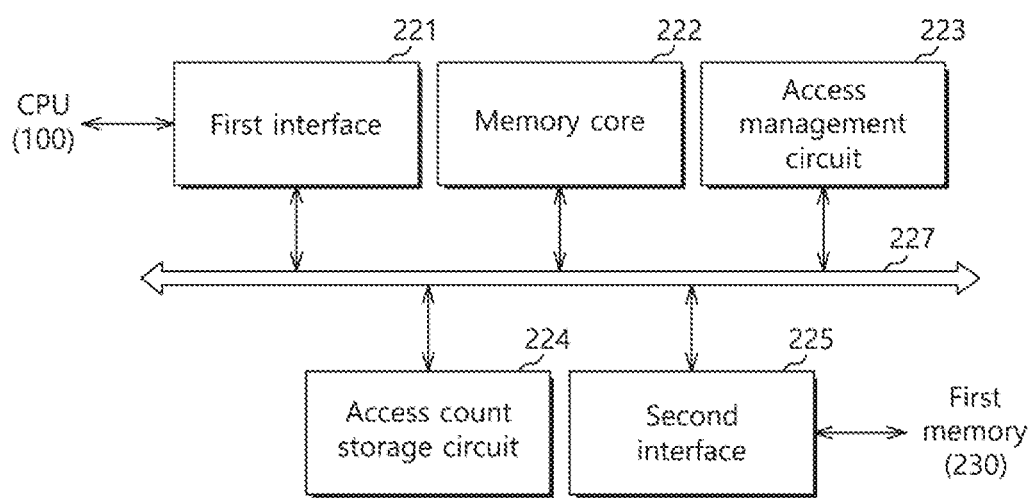
FIGS. 3A and 3B are diagrams illustrating examples of configurations of a first controller of a first memory device.

FIG. 3A is a diagram illustrating an example of the configuration of the first controller 220 of the first memory device 210 in accordance with an embodiment.

Referring to FIG. 3A, the first controller 220 may include a first interface 221, a memory core 222, an access management circuit 223, an access count storage circuit 224, and a second interface 225.

The first interface 221 may be configured to receive a command transmitted from the CPU 100 or transmit data to the CPU 100, through the system bus 500.

The memory core 222 may control general operations of the first controller 220. The memory core 222 may be configured by a micro control unit (MCU) or a central processing unit (CPU). The memory core 222 may process a command transmitted from the CPU 100. In order to process a command transmitted from the CPU 100, the memory core 222 may drive a code type instruction or algorithm, that is, a firmware, and may control internal function blocks, such as the first interface 221, the access management circuit 223, the access count storage circuit 224 and the second interface 225, and the first memory 230.

The memory core 222 may generate control signals for controlling an operation of the first memory 230, based on a command transmitted from the CPU 100, and may provide the generated control signals to the first memory 230 through the second interface 225.

The memory core 222 may group the entire data storage region of the first memory 230 into a plurality of access management regions each of which includes a plurality of pages. The memory core 222 may manage access counts for the respective access management regions of the first memory 230, by using the access management circuit 223.

The access management circuit 223 may manage access counts for the respective access management regions of the first memory 230 according to the control of the memory core 222. For example, the access management circuit 223 may increment an access count of a corresponding access management region, which access count is stored in the access count storage circuit 224, each time such region of the first memory 230 is accessed. The access to an access management region may be an access to a certain page among a plurality of pages in the corresponding access management region. For example, when a first page in a first access management region is accessed, it is the access count of the first access management region that is incremented, not an access count of the first page per se.

The access count storage circuit 224 may be configured to store access counts of the respective access management regions of the first memory 230. The access count storage circuit 224 may be included in a certain region of a memory (not illustrated) such as an SRAM and a DRAM included in the first controller 220 or may be provided as a separate register.

The second interface 225 may control the first memory 230 according to the control of the memory core 222. The second interface 225 may provide control signals, generated by the memory core 222, to the first memory 230. The control signals may include a command, an address, an operation control signal and the like for controlling the first memory 230. The second interface 225 may provide data to the first memory 230 or may be provided with data from the first memory 230.

The first interface 221, the memory core 222, the access management circuit 223, the access count storage circuit 224 and the second interface 225 of the first controller 220 may be electrically coupled through an internal bus 227.

Figure 3B:
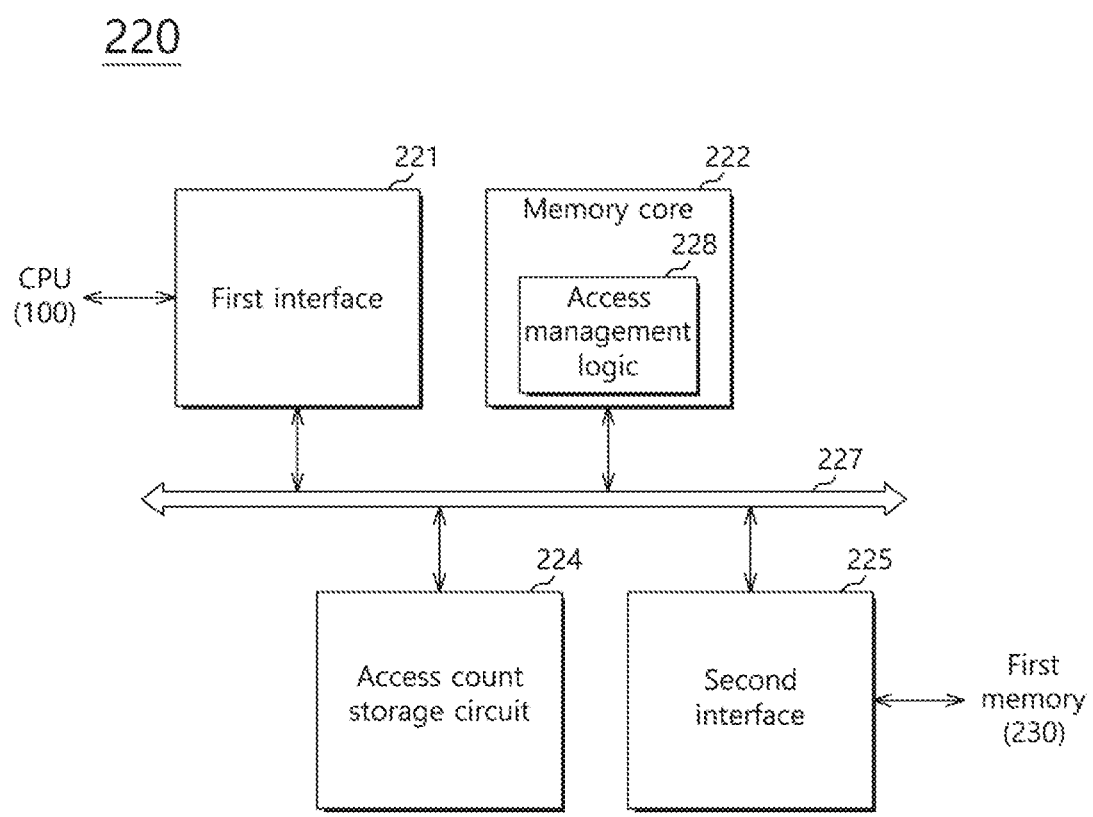

FIG. 3B is a diagram illustrating an example of the configuration of the first controller 220 of the first memory device 210 in accordance with another embodiment. In describing the configuration of the first controller 220 of FIG. 3B, description of components in, and previously described with respect to, the first controller 220 of FIG. 3A is omitted here.

Referring to FIG. 3B, the first controller 220 may include an access management logic 228 which is included in the memory core 222. The access management logic 228 may be configured by software, hardware or a combination thereof.

Figures 4A, 4B:
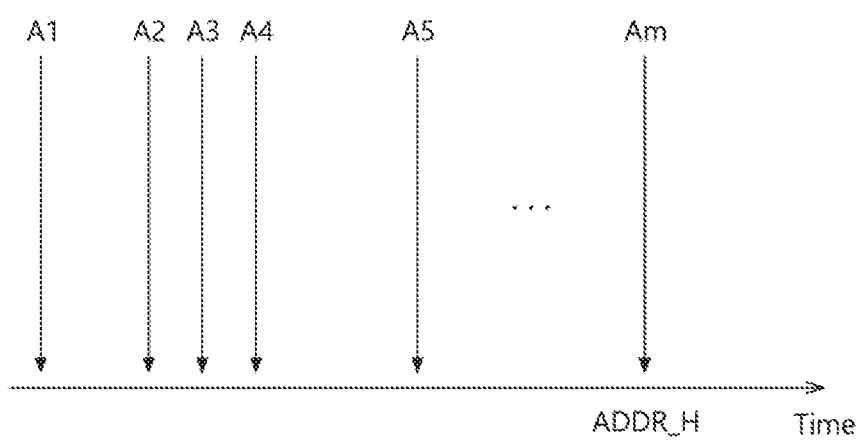
FIG. 4A is a diagram illustrating an example of a configuration of an access count storage circuit.
FIG. 4B is a diagram illustrating an example of determining whether or not hot data has occurred for one access management region.

FIG. 4A is a diagram illustrating an example of the configuration of the access count storage circuit 224, FIG. 4B is a diagram illustrating an example of determining whether or not a hot page has occurred for one access management region, and FIG. 4C is a diagram illustrating an example of a state in which a hot page address is stored in the access count storage circuit 224. By way of example, it is assumed that the first memory 230 is grouped into n access management regions. Here, n is a natural number of 1 or greater.

Referring to FIG. 4A, the access count storage circuit 224 may be configured to store n access counts for n access management regions REGION1 to REGIONn, respectively, and store a hot page address when a hot page occurs. A hot page represents a page in which hot data is stored, and a hot page and hot data may have the same meaning in the present specification. A hot page may be a page which is accessed at a time when an access count of a corresponding access management region is at or exceeds a threshold value m, where m≥1. The threshold value may be preset.

For example, as illustrated in FIG. 4B, it is assumed that m accesses have been made to a first access management region REGION1 of the first memory 230 from the CPU 100. When a first access A1 is made, an access count corresponding to the first access management region REGION1 in the access count storage circuit 224 may be changed from '0' to '1.' The access count may be maintained in an access count field. Then, each time each another access is made, i.e., from the second access A2 to an mth access Am, the access count corresponding to the first access management region REGION1 in the access count storage circuit 224 may be incremented by '1,' and will eventually become 'm' as illustrated in FIG. 4C.

When an access count of the first access management region REGION1 reaches 'm,' the access management circuit 223 may store an address (for example, ADDR_H) corresponding to a page accessed on the mth access, among a plurality of pages in the first access management region REGION1, in a hot page address field corresponding to the first access management region REGION1 in the access count storage circuit 224. The determination of the mth accessed page as a hot page may be performed based on probability. That is to say, based on a characteristic that a previously accessed page has a high probability to be accessed again, it is assumed that most of the m accesses to the first access management region REGION1 are to the mth accessed page. In this way, by determining a hot page based on probability, even though an access count is managed by the unit of access management region, which unit is larger than that of a page, it is possible to track a hot page with a high degree of accuracy, and as a result, data migration may be performed by the unit of page.

Moreover, as described above, by managing an access count not by the unit of page but by a larger unit (that is, an access management region including a plurality of pages), it is possible to prevent storage overhead for storage of access counts from increasing.

It was described that the first controller 220 of the first memory device 210 manages access counts of the respective access management regions of the first memory 230, and when an access count of an access management region reaches the threshold value m, stores an address corresponding to the mth accessed page accessed, among the pages in the corresponding access management region, as a hot page address. Below, a method for migrating data stored in a hot page, determined based on an access count of each access management region, to the second memory device 250 having a high operating speed is described in detail.

FIG. 5 is a flow chart to assist in the explanation of a data management method in accordance with an embodiment. In explaining the data management method in accordance with the present embodiment, in addition to reference to FIG. 5, reference may be made to FIGS. 3A to 4C.

At step S501, the CPU 100 may determine whether a period (e.g., a preset period) for checking whether a hot page exists in the first memory 230 of the first memory device 210 is reached. If so, the process may proceed to step S503.

At the step S503, the CPU 100 may transmit a command for checking whether a hot page exists in the first memory 230, that is, a hot page checking command CMD_H is transmitted to the first memory device 210 through the system bus 500 (see FIG. 1).

At step S505, the first controller 220 of the first memory device 210 may check whether an address (that is, a hot page address) stored in the access count storage circuit 224, e.g., in the host page address field thereof, exists, in response to the hot page checking command CMD_H received from the CPU 100. When it is determined that a hot page address is stored in the access count storage circuit 224, the process may proceed to step S507. On the other hand, when no hot page address is stored in the access count storage circuit 224, the process may proceed to step S509.

At the step S507, the first controller 220 of the first memory device 210 may transmit a hot page address ADDR_H to the CPU 100 through the system bus 500. Thereafter, the process may proceed to step S511.

On the other hand, at the step S509, the first controller 220 of the first memory device 210 may transmit to the CPU 100 a response RES_NH indicating that no hot page exists. Thereafter, the process may proceed to step S517.

At the step S511, the CPU 100 may transmit a data migration command CMD_DM to the first memory device 210 and the second memory device 250. The data migration command CMD_DM may include a data migration command for migrating hot data, stored in a page corresponding to the hot page address ADDR_H of the first memory 230 of the first memory device 210, to the second memory 270 of the second memory device 250. Also, the data migration command CMD_DM may include a command for migrating cold data, stored in a cold page of the second memory 270 of the second memory device 250, to the first memory 230 of the first memory device 210. Thus, thereafter, the process may proceed to step S513 and step S515, respectively. For example, steps S513 and S515 may be simultaneously performed, but it is to be noted that the present invention is not specifically limited to such parallel processing.

At the step S513, the second controller 260 of the second memory device 250 may read cold data from a cold page of the second memory 270 and temporarily store the read cold data in a buffer memory (not illustrated), and may store hot data received from the first memory device 210 in the cold page. Further, the second controller 260 may transmit the cold data temporarily stored in the buffer memory to the first memory device 210.

If the second memory 270 of the second memory device 250 includes an empty page, the procedure in which cold data is read from a cold page and is temporarily stored in the buffer memory may be omitted, and hot data of the first memory 230 may be immediately stored in the empty page of the second memory 270.

However, in order to migrate hot data of the first memory 230 to the second memory 270 in a state in which the second memory 270 is full, the hot data needs to be exchanged with data stored in the second memory 270. To this end, the CPU 100 may select data, among data stored in the second memory 270, to be exchanged with hot data of the first memory 230, and criteria for selecting data in the second memory 270 may be a time of last access or frequency of access. For example, the CPU 100 may select data (that is, cold data) stored in a page which is least recently used among pages of the second memory 270, as data to be exchanged with hot data of the first memory 230.

At the step S511, the CPU 100 may select cold data in the second memory 270 of the second memory device 250 before transmitting the data migration command CMD_DM to the first memory device 210 and the second memory device 250. The data migration command CMD_DM may include a cold page address at which the selected cold data is stored. A method for the CPU 100 to select cold data in the second memory 270 is described below in detail with reference to FIG. 6.

At the step S515, the first controller 220 of the first memory device 210 may read hot data from a hot page of the first memory 230 and transmit the read hot data to the second memory device 250, and may store cold data received from the second memory device 250 in the hot page.

At the step S517, the CPU 100 may transmit an access count storage circuit reset command CMD_R, for initializing values stored in the access count field and the hot page address field of the access count storage circuit 224, to the first memory device 210. While it was described above by way of example that the CPU 100 sequentially transmits the commands CMD_H, CMD_DM and CMD_R, the CPU 100 may transmit a single aggregate command including all of the above-described commands CMD_H, CMD_DM and CMD_R to the first and second memory devices 210 and 250.

At step S519, the first controller 220 of the first memory device 210 may initialize values (or information) stored in the access count storage circuit 224, according to the access count storage circuit reset command CMD_R received from the CPU 100.

FIG. 6 is a diagram illustrating an example of least recently used (LRU) queues for the first memory 230 and the second memory 270, respectively. As described above, the CPU 100 may select cold data in the second memory 230 to be exchanged with hot data of the first memory 230, by using the LRU queue of the second memory 270 illustrated in FIG. 6.

The CPU 100 may separately manage the LRU queues for the first memory 230 and the second memory 270, respectively. For convenience of explanation, the LRU queue for the first memory 230 is referred to as a first LRU queue LRUQ1, and the LRU queue for the second memory 270 is referred to as a second LRU queue LRUQ2. The first LRU queue LRUQ1 and the second LRU queue LRUQ2 may be stored in the first memory 230 or the second memory 270. The first LRU queue LRUQ1 and the second LRU queue LRUQ2 may have the same configuration. For example, each of the first LRU queue LRUQ1 and the second LRU queue LRUQ2 may include a plurality of spaces for queueing a plurality of addresses. In each of the first LRU queue LRUQ1 and the second LRU queue LRUQ2, an address of a most recently used (MRU) page may be queued in a first space at one end of the corresponding queue, and an address of a least recently used (LRU) page may be queued in a first space at the other end.

Each time an access is made to each of the first memory 230 and the second memory 270, an address of an accessed page stored in the MRU space of each of the first LRU queue LRUQ1 and the second LRU queue LRUQ2 is updated, and addresses of remaining accessed pages from an accessed page previously stored in the MRU space may be shifted one space toward the LRU space.

The CPU 100 may check an LRU page in the second memory 270 by referring to the second LRU queue LRUQ2, and may determine data stored in the corresponding page as cold data to be exchanged with hot data of the first memory 230. On the other hand, if the exchange of hot data of the first memory 230 and cold data of the second memory 270 is completed, the CPU 100 may update information, that is, page addresses, stored in the MRU spaces of the first LRU queue LRUQ1 and the second LRU queue LRUQ2.

FIG. 7A is a diagram illustrating an example of a data migration between the first memory device 210 and the second memory device 250, and FIG. 7B is a diagram to assist in the explanation of a state in which the first LRU queue LRUQ1 and the second LRU queue LRUQ2 are updated after a data migration.

Referring to FIG. 7A, the CPU 100 may transmit the data migration command CMD_DM to the first memory device 210 and the second memory device 250 through the system bus 500 (①).

The data migration command CMD_DM may include an address of a hot page in which hot data is stored in the first memory 230, a read command for reading the hot data from the hot page and a write command for storing cold data transmitted from the second memory device 250. However, the present invention is not specifically limited this configuration.

Also, the data migration command CMD_DM may include an address of a cold page in which cold data is stored in the second memory 270, a read command for reading the cold data from the cold page and a write command for storing hot data transmitted from the first memory device 210. However, the present invention is not specifically limited to this configuration.

The second controller 260 of the second memory device 250 which receives the data migration command CMD_DM from the CPU 100 may read cold data from the second memory 270 and may temporarily store the read cold data in a buffer memory (not illustrated) included in the second controller 260 (②). Similarly, the first controller 220 of the first memory device 210 may read hot data from the first memory 230 based on the data migration command CMD_DM (②), and may transmit the read hot data to the second controller 260 (③).

The second controller 260 may store the hot data received from the first memory device 210, in the second memory 270 (④). A region in which the hot data is stored in the second memory 270 is a region in which the cold data was stored.

The second controller 260 may transmit the cold data temporarily stored in the buffer memory to the first memory device 210 (⑤). The first controller 220 may store the cold data received from the second memory device 250, in the first memory 230 (⑥). A region in which the cold data is stored in the first memory 230 is a region in which the hot data was stored. As a result, the hot data of the first memory 230 may be exchanged with the cold data of the second memory 270.

As described above, to execute a data migration between the first memory 230 and the second memory 270, the CPU 100 accesses a page in which hot data is stored in the first memory 230, and accesses an LRU page (see FIG. 6) in the second memory 270.

Due to this fact, as illustrated in FIG. 7B, an address (for example, ADDR_C) corresponding to an LRU page in the second LRU queue LRUQ2 before data exchange may be stored in the MRU space as an MRU address in the second LRU queue LRUQ2 after data exchange. As new address information (i.e., ADDR_C) is stored in the MRU space of the second LRU queue LRUQ2, subsequent addresses including an address previously stored in the MRU space may be migrated one space by one space toward the LRU space. For example, it is assumed that, before data exchange, addresses '1' to 'k' are stored in the second LRU queue LRUQ2 and the address 'k' is the cold page address ADDR_C. After data exchange, as the address 'k' is stored in the MRU space of the second LRU queue LRUQ2, each of the addresses '1' to 'k−1' is migrated or shifted one space rightward, and thus the address 'k−1' becomes an LRU page.

Moreover, an address (for example, ADDR_H) corresponding to a hot page in the first LRU queue LRUQ1 before data exchange may be stored in the MRU space as an MRU address in the first LRU queue LRUQ1 after data exchange. As a new address (that is, ADDR_H) is stored in the MRU space of the first LRU queue LRUQ1, each of addresses from an address which is previously stored in the MRU space to an address which is previously stored in a space before a space in which the hot page address ADDR_H was previously stored may be migrated one space toward the LRU space. For example, it is assumed that, before data exchange, addresses '1' to 'k' are stored in the first LRU queue LRUQ1 and the address '3' is the hot page address ADDR_H. After data exchange, as the address '3' is stored in the MRU space of the first LRU queue LRUQ1, the addresses '1' and '2' are each migrated one space rightward. In the first LRU queue LRUQ1, the address 'k' is still an LRU page.

When data exchange is completed, the first controller 220 of the first memory device 210 may perform a reset operation of initializing information stored in the access count field and the hot page address field of the access count storage circuit 224. The reset operation for the access count storage circuit 224 is performed in this way because, in the case where an access count reaches the threshold value m as the access count is incremented for a substantially long time, it is unnecessary to migrate data stored in a corresponding page to the second memory 270 as hot data. In other words, in this case, the hot data may be invalid (or meaningless) hot data. Therefore, each time commands for periodically checking hot data, migrating the hot data and resetting the access count storage circuit 224 are received from the CPU 100, the first controller 220 resets the access count storage circuit 224 regardless of whether or not hot data exists and whether or not a data migration is performed.

Figure 8:
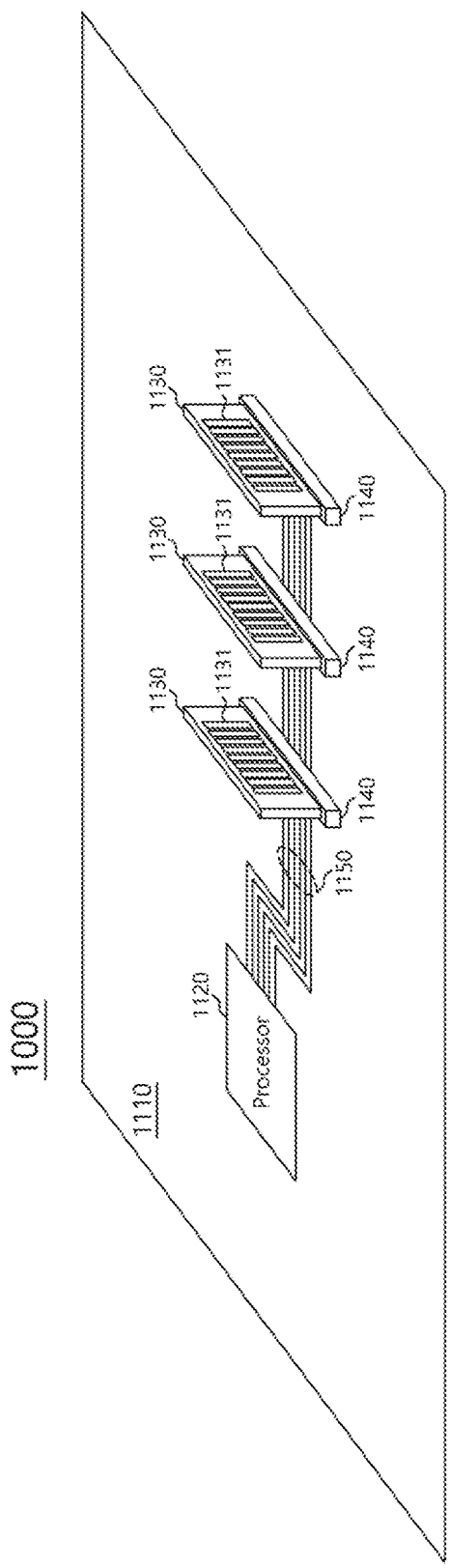
FIGS. 8 and 9 are diagrams illustrating examples of systems in accordance with embodiments of the present invention.

FIG. 8 is a diagram illustrating an example of the configuration of a system 1000 in accordance with an embodiment. In FIG. 8, the system 1000 may include a main board 1110, a processor 1120 and memory modules 1130. The main board 1110, on which components constituting the system 1000 may be mounted, may be referred to as a mother board. The main board 1110 may include a slot (not illustrated) in which the processor 1120 may be mounted and slots 1140 in which the memory modules 1130 may be mounted. The main board 1110 may include wiring lines 1150 for electrically coupling the processor 1120 and the memory modules 1130. The processor 1120 may be mounted on the main board 1110. The processor 1120 may include a central processing unit (CPU), a graphic processing unit (GPU), a multimedia processor (MMP) or a digital signal processor. Further, the processor 1120 may be realized in the form of a system-on-chip by combining processor chips having various functions, such as application processors (AP).

The memory modules 1130 may be mounted on the main board 1110 through the slots 1140 of the main board 1110. The memory modules 1130 may be coupled with the wiring lines 1150 of the main board 1110 through module pins formed in module substrates and the slots 1140. Each of the memory modules 1130 may include, for example, a UDIMM (unbuffered dual in-line memory module), a DIMM (dual in-line memory module), an RDIMM (registered dual in-line memory module), an LRDIMM (load-reduced dual in-line memory module), an SODIMM (small outline dual in-line memory module) or an NVDIMM (nonvolatile dual in-line memory module).

The main memory device 200 illustrated in FIG. 1 may be applied as the memory module 1130. Each of the memory modules 1130 may include a plurality of memory devices 1131. Each of the plurality of memory devices 1131 may include at least one of a volatile memory device and a nonvolatile memory device. The volatile memory device may include an SRAM, a DRAM or an SDRAM, and the nonvolatile memory device may include a ROM, a PROM, an EEPROM, an EPROM, a flash memory, a PRAM, an MRAM, an RRAM or an FRAM. The second memory device 250 of the main memory device 200 illustrated in FIG. 1 may be applied as the memory device 1131 including a nonvolatile memory device. Moreover, each of the memory devices 1131 may include a stacked memory device or a multi-chip package which is formed as a plurality of chips are stacked.

Figure 9:
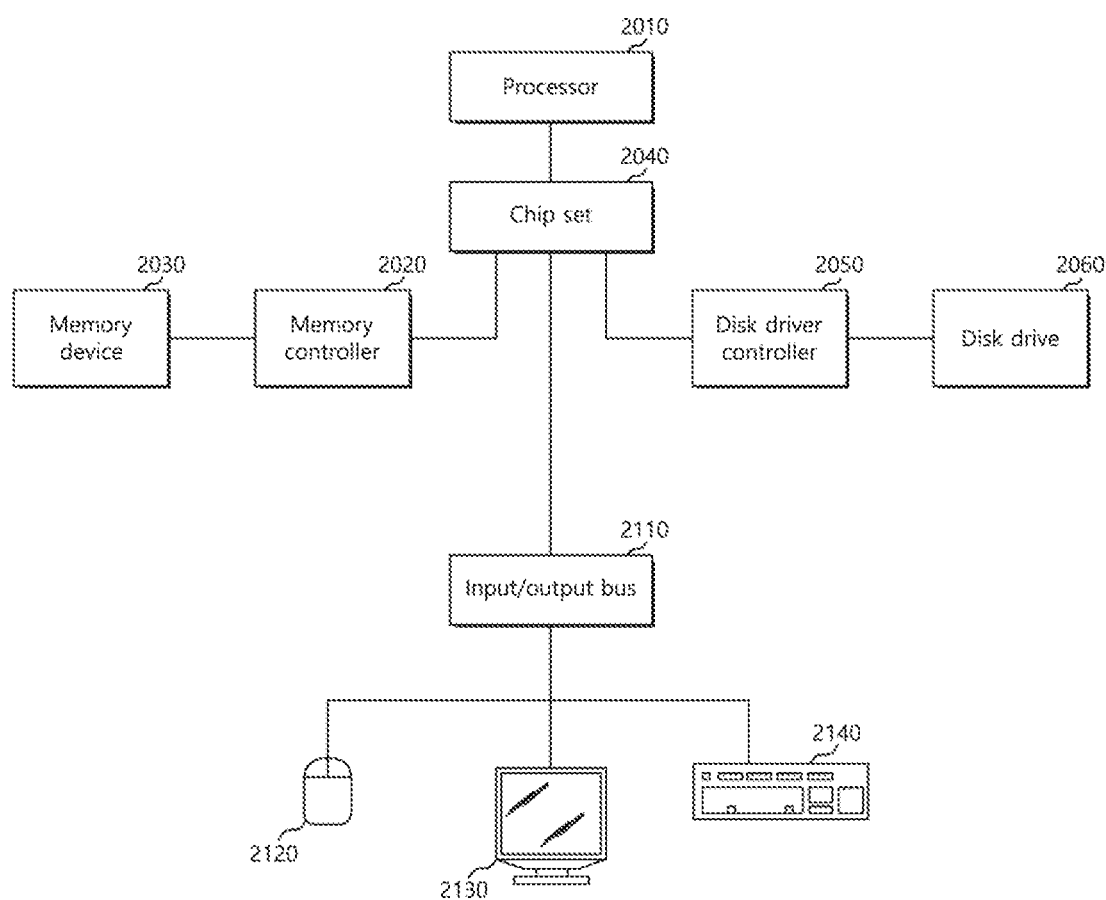

FIG. 9 is a diagram illustrating an example of the configuration of a system 2000 in accordance with an embodiment. In FIG. 9, the system 2000 may include a processor 2010, a memory controller 2020 and a memory device 2030. The processor 2010 may be coupled with the memory controller 2020 through a chip set 2040, and the memory controller 2020 may be coupled with the memory device 2030 through a plurality of buses. While one processor 2010 is illustrated in FIG. 9, it is to be noted that the present invention is not specifically limited to such configuration; a plurality of processors may be provided physically or logically.

The chip set 2040 may provide communication paths through which signals are transmitted between the processor 2010 and the memory controller 2020. The processor 2010 may perform an arithmetic operation, and may transmit a request and data to the memory controller 2020 through the chip set 2040 to input/output desired data.

The memory controller 2020 may transmit a command signal, an address signal, a clock signal and data to the memory device 2030 through the plurality of buses. By receiving the signals from the memory controller 2020, the memory device 2030 may store data and output stored data to the memory controller 2020. The memory device 2030 may include at least one memory module. The main memory device 200 of FIG. 1 may be applied as the memory device 2030.

In FIG. 9, the system 2000 may further include an input/output bus 2110, input/output devices 2120, 2130 and 2140, a disk driver controller 2050 and a disk drive 2060. The chip set 2040 may be coupled with the input/output bus 2110. The input/output bus 2110 may provide communication paths for transmission of signals from the chip set 2040 to the input/output devices 2120, 2130 and 2140. The input/output devices 2120, 2130 and 2140 may include a mouse 2120, a video display 2130 and a keyboard 2140. The input/output bus 2110 may include any communication protocol communicating with the input/output devices 2120, 2130 and 2140. Further, the input/output bus 2110 may be integrated into the chip set 2040.

The disk driver controller 2050 may operate by being coupled with the chip set 2040. The disk driver controller 2050 may provide communication paths between the chip set 2040 and the at least one disk drive 2060. The disk drive 2060 may be utilized as an external data storage device by storing commands and data. The disk driver controller 2050 and the disk drive 2060 may communicate with each other or with the chip set 2040 by using any communication protocol including the input/output bus 2110.

While various embodiments have been illustrated and described, it will be understood to those skilled in the art that the embodiments described are examples only. Accordingly, the present invention is not limited to the described embodiments. Rather, the present invention encompasses all variations and modifications of the disclosed embodiments that fall within the scope of the claims and their equivalents.

What is claimed is:

1. A main memory device comprising:
a first memory device; and
a second memory device having an access latency different from that of the first memory device,
wherein the first memory device determines, based on an access count for at least one region of the first memory device, a hot page included in the at least one region,
wherein the at least one region includes a plurality of pages,
wherein the first memory device manages the access count for the at least one region rather than each of the plurality of pages,
wherein the first memory device comprises a first memory and a first controller which controls an operation of the first memory,
wherein the first controller comprises:
an access count storage circuit configured with an access count field in which the access count for the at least one region is stored and a hot page address field in which an address of the hot page is stored; and an access management circuit configured to increment the access count each time the at least one region is accessed, and wherein, when the access count for the at least one region reaches a threshold value, the access management circuit determines a last accessed page of the at least one region as the hot page, and stores the address of the hot page in the access count storage circuit.

2. The main memory device according to claim 1, wherein, when a hot data checking command is received from an external device, the first controller checks whether the hot page exists in the first memory, by referring to information stored in the access count storage circuit, and transmits a result of the check to the external device.

3. The main memory device according to claim 2, wherein the first controller transmits the address of the hot page to the external device as the check result when the hot page exists, and transmits to the external device information indicating that the hot page does not exist as the check result when the hot page does not exist.

4. The main memory device according to claim 3, wherein, when a data migration command is received from the external device, a data migration operation of exchanging hot data stored in the hot page of the first memory with cold data stored in a second memory of the second memory device is performed.

5. The main memory device according to claim 4, wherein the first memory comprises a nonvolatile memory, and the second memory comprises a volatile memory.

6. The main memory device according to claim 5, wherein the nonvolatile memory comprises a phase change random access memory (PCRAM), and the volatile memory comprises a dynamic random access memory (DRAM).

7. The main memory device according to claim 1, wherein an access latency of the first memory device is longer than the access latency of the second memory device.

8. A main memory device comprising:
a first memory device; and
a second memory device having a power consumption per unit time different from that of the first memory device,
wherein the first memory device determines, based on an access count for at least one region of the first memory device, a hot page included in the at least one region,
wherein the at least one region includes a plurality of pages,
wherein the first memory device manages the access count for the at least one region rather than each of the plurality of pages, and
wherein the first memory device comprises a first memory and a first controller which controls an operation of the first memory,
wherein the first controller comprises:
an access count storage circuit configured with an access count field in which the access count for the at least one region is stored and a hot page address field in which an address of the hot page is stored; and
an access management circuit configured to increment the access count each time the at least one region is accessed, and
wherein, when the access count for the at least one region reaches a threshold value, the access management circuit determines a last accessed page of the at least one region as the hot page, and stores the address of the hot page in the access count storage circuit.

9. The main memory device according to claim 8, wherein a power consumption per unit time of the first memory device is larger than the power consumption per unit time of the second memory device.

10. A computer system comprising:
a central processing unit (CPU); and
a main memory device coupled with the CPU through a system bus,
wherein the main memory device comprises:
a first memory device; and
a second memory device having an access latency shorter than that of the first memory device, and
wherein the first memory device determines, based on an access count for each of one or more regions of the first memory device, a hot page included in at least one of the one or more regions,
wherein the each of the one or more regions include a plurality of pages,
wherein the first memory device manages the access count for the each of the one or more regions rather than each of the plurality of pages,
wherein the first memory device comprises a first memory and a first controller which controls an operation of the first memory, and
wherein the first controller comprises:
an access count storage circuit configured with an access count field in which the access count for each of the one or more regions are stored and a hot page address field in which an address of the hot page is stored; and
an access management circuit configured to increment, each time each of the one or more regions is accessed, the access count corresponding to the region accessed, and
wherein, when an access count of a region of the one or more regions reaches a threshold value, the access management circuit determines a last accessed page in the corresponding region as the hot page, and stores an address corresponding to the determined hot page in the access count storage circuit, as the address of the hot page.

11. The computer system according to claim 10, wherein the CPU manages a first least recently used (LRU) queue configured to store page addresses accessed in the first memory in access order, and a second LRU queue configured to store page addresses accessed in a second memory of the second memory device in access order.

12. The computer system according to claim 11, wherein the CPU transmits to the first memory device at each of multiple set times a hot data checking command for performing a hot page checking operation.

13. The computer system according to claim 12, wherein the first memory device checks whether the hot page exists in the first memory, by referring to the hot page address field of the access count storage circuit, in response to the hot data checking command received from the CPU, and transmits a result of the check to the CPU.

14. The computer system according to claim 13, wherein the first memory device transmits the address corresponding to the hot page to the CPU as the check result when the hot page exists, and transmits to the CPU information indicating that the hot data does not exist as the check result when the hot page does not exist.

15. The computer system according to claim 14, wherein the CPU determines a cold page in the second memory by referring to the second LRU queue, and transmits a data migration command to the main memory device for exchanging hot data stored in the hot page of the first memory and cold data stored in the cold page of the second memory.

16. The computer system according to claim 15, wherein, according to the data migration command received from the CPU, the second memory device reads the cold data from the cold page, temporarily stores the read cold data, stores the hot data received from the first memory device in the cold page, and transmits the temporarily stored cold data to the first memory device.

17. The computer system according to claim 16, wherein, according to the data migration command received from the CPU, the first memory device reads the hot data from the hot page, transmits the read hot data to the second memory device, and stores the cold data received from the second memory device in the hot page.

18. The computer system according to claim 17, wherein, when exchange of the hot data and the cold data is completed in the main memory device, the CPU updates information stored in the first LRU queue and the second LRU queue.

19. The computer system according to claim 18, wherein the CPU stores an address corresponding to the hot page of the first memory in a most recently used (MRU) space of the first LRU queue, and stores an address corresponding to the cold page in an MRU space of the second LRU queue.

20. The computer system according to claim 15, wherein the CPU transmits a reset command for initializing information stored in the access count storage circuit, to the first memory device at each of multiple set times.

21. The computer system according to claim 20, wherein the first memory device initializes the access counts and the address of the hot page stored in the access count storage circuit, according to the reset command received from the CPU.

22. The computer system according to claim 10, wherein the first memory device comprises a nonvolatile memory, and the second memory device comprises a volatile memory.

23. The computer system according to claim 22, wherein the nonvolatile memory comprises a phase change random access memory (PCRAM), and the volatile memory comprises a dynamic random access memory (DRAM).

24. A data management method of a computer system including a central processing unit (CPU) and a main memory device which is coupled with the CPU through a system bus and is configured with a first memory device and a second memory device having different access latencies, the data management method comprising:
transmitting, by the CPU to the first memory device, a hot page checking command for checking whether a hot page exists in a first memory of the first memory device;
transmitting, by the first memory device to the CPU, one of a first response including an address corresponding to the hot page in the first memory and a second response indicating that the hot page does not exist in the first memory, depending on whether the hot page exists or not; and
transmitting, by the CPU to the main memory device, when the first response is received from the first memory device, a data migration command for exchanging hot data stored in the hot page of the first memory and cold data in a second memory of the second memory device,
wherein the first memory device includes:
at least one region having a plurality of pages;
an access count storage circuit configured with an access count field in which the access count for each of the at least one region is stored and a hot page address field in which an address of the hot page is stored; and
an access management circuit configured to increment, each time each of the at least one region is accessed, the access count corresponding to the region accessed, and
wherein, when an access count for the at least one region reaches a threshold value, the first memory device determines a last accessed page of the at least one region as the hot page, and stores an address corresponding to the hot page in the access count storage circuit.

25. The data management method according to claim 24, wherein the transmitting of the hot page checking command is performed at each of multiple set times.

26. The data management method according to claim 24, further comprising, after the transmitting of the data migration command to the main memory device:
reading, by the second memory device, the cold data from a cold page of the second memory and temporarily storing the read cold data in a buffer memory;
reading, by the first memory device, the hot data from the hot page of the first memory and transmitting the read hot data to the second memory;
storing, by the second memory device, the hot data received from the first memory device in the cold page of the second memory;
transmitting, by the second memory device, the cold data temporarily stored in the buffer memory to the first memory device; and
storing, by the first memory device, the cold data received from the second memory device in the hot page of the first memory.

27. The data management method according to claim 26, wherein the cold page of the second memory is selected by the CPU based on a least recently used (LRU) queue in which page addresses accessed in the second memory are stored in access order.

28. The data management method according to claim 27, wherein the CPU selects a least recently used page address among the page addresses stored in the LRU queue as the cold page.

29. The data management method according to claim 24, further comprising, after the storing of the cold data in the hot page of the first memory: updating information stored in a first LRU queue in which page addresses accessed in the first memory are stored in access order and a second LRU queue in which page addresses accessed in the second memory are stored in access order.

30. The data management method according to claim 29, wherein the updating of the information stored in the first LRU queue and the second LRU queue comprises:
storing an address corresponding to the hot page of the first memory in a most recently used (MRU) space of the first LRU queue; and
storing an address corresponding to the cold page of the second memory in an MRU space of the second LRU queue.

31. The data management method according to claim 24, further comprising after the transmitting of the data migration command to the main memory device:

transmitting, by the CPU to the first memory device, a reset command for initializing an access count storage circuit in which information on the hot page is stored; and initializing, by the first memory device, the access count storage circuit in response to the reset command.

32. The data management method according to claim 24, further comprising when the second response is received from the first memory device:

transmitting, by the CPU to the first memory device, a reset command for initializing the access count storage circuit in which information on the hot page is stored; and initializing, by the first memory device, the access count storage circuit in response to the reset command.

33. A memory system comprising:

a first memory device including plural groups each having one or more first memory regions;

a second memory device including plural second memory regions;

a first controller configured to determine, based on an access count for each of the plural groups of the first memory device, a hot memory region included in one of the plural groups; and a second controller configured to identify a cold memory region, which is least recently accessed among the second memory regions, wherein the first and second controllers respectively control the first and second memory devices to swap data between the hot memory region and the cold memory region, wherein the first controller comprises:

an access count storage circuit configured with an access count field in which the access count for at least one memory region of the first memory device is stored and a hot memory region address field in which an address of a hot memory region included in the at least one memory region is stored; and an access management circuit configured to increment the access count each time the at least one memory region is accessed, and wherein, when an access count of a group of the plural groups reaches a threshold value, the first controller determines a last accessed memory region in the corresponding group as the hot memory region, and stores an address corresponding to the determined hot memory region in the access count storage circuit.

34. A memory system comprising:

a first memory device including plural groups each having one or more first memory regions;

a second memory device;

a first controller configured to determine, based on an access count for each of the plural groups of the first memory device, a hot memory region included in one of the plural groups; and a second controller configured to control an operation of the second memory device, wherein the first and second controllers respectively control the first and second memory devices to migrate data of the hot memory region to the second memory device, wherein the first controller comprises:

an access count storage circuit configured with an access count field in which the access count for at least one memory region of the first memory device is stored and a hot memory region address field in which an address of a hot memory region included in the at least one memory region is stored; and an access management circuit configured to increment the access count each time the at least one memory region is accessed, and wherein, when an access count of a group of the plural groups reaches a threshold value, the first controller determines a last accessed memory region in the corresponding group as the hot memory region, and stores an address corresponding to the determined hot memory region in the access count storage circuit.

* * * * *